(12) United States Patent
Rodriguez Bravo (10) Patent No.: US 12,413,616 B2
(45) Date of Patent: Sep. 9, 2025

(54) PREVENTING FRAUD ON SMART DEVICES (71) Applicant: Kyndryl, Inc., New York, NY (US)

(72) Inventor: Cesar Augusto Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 208 days.

(21) Appl. No.: 18/354,779

(22) Filed: Jul. 19, 2023

(65) Prior Publication Data

US 2025/0030727 A1 Jan. 23, 2025

(51) Int. Cl.
*H04L 9/40* (2022.01)
(52) U.S. Cl.
CPC ...... *H04L 63/1441* (2013.01); *H04L 63/1416* (2013.01); *H04L 63/1425* (2013.01)
(58) Field of Classification Search
CPC ............ H04L 63/1441; H04L 63/1416; H04L 63/1425
USPC .......................................................... 726/23
See application file for complete search history.

(56) References Cited

U.S. PATENT DOCUMENTS

| | | | | |
|---|---|---|---|---|
| 11,811,792 B1* | 11/2023 | Silva | ............ | G06F 40/279 |
| 2013/0162821 A1* | 6/2013 | Park | ............ | G08B 13/19697 381/56 |
| 2017/0134574 A1* | 5/2017 | Winkler | ............ | H04L 63/0861 |
| 2017/0293757 A1* | 10/2017 | Rosenman | ............ | G06F 21/554 |
| 2018/0294959 A1 | 10/2018 | Traynor et al. | | |
| 2020/0035254 A1* | 1/2020 | Boss | ............ | G10L 15/16 |
| 2020/0067861 A1 | 2/2020 | Leddy et al. | | |
| 2022/0046053 A1* | 2/2022 | Stolarz | ............ | H04K 1/00 |
| 2022/0303388 A1* | 9/2022 | Shvetsov | ............ | H04M 3/436 |
| 2022/0319539 A1* | 10/2022 | Panda | ............ | G10L 25/66 |
| 2023/0008822 A1* | 1/2023 | Serban | ............ | H04M 3/493 |

OTHER PUBLICATIONS

Derakhshan et al., "Detecting Telephone-based Social Engineering Attacks using Scan Signatures," IWSPA'21, Session 2: Security Analytics, Apr. 28, 2021, pp. 67-73.
Kale et al., "Classification of Fraud Calls by Intent Analysis of Call Transcripts," IEEE, 12th International Conference on Computing Communication and Networking Technologies, Nov. 3, 2021, 4 pages, Abstract Only.

\* cited by examiner

*Primary Examiner* — Badrinarayanan
(74) *Attorney, Agent, or Firm* — CANTOR COLBURN LLP; Erik Swanson (57) ABSTRACT

Embodiments relate to preventing fraud on smart devices. In response to receiving a communication, a correlation of the communication to a security threat is determined, and device data of a device is obtained. A determination is made that a combination of the correlation and the device data meets a predefined threshold for the security threat. An alert is audibly output on the device, the audio alert being a warning of the security threat presented by the communication.

17 Claims, 8 Drawing Sheets

PREVENTING FRAUD ON SMART DEVICES

BACKGROUND

The present invention generally relates to computer systems, and more specifically, to computer-implemented methods, computer systems, and computer program products configured and arranged to prevent fraud on smart devices.

Cybersecurity is the practice of protecting critical systems and sensitive information from digital attacks. Cybersecurity is also known as information technology (IT) security. Cybersecurity measures are designed to combat threats against networked systems and applications, whether those threats originate from inside or outside of an organization. Further, cybersecurity protects against attack by malicious actors that may result in unauthorized information disclosure, theft of data, or damage to hardware, software, or data. Cybersecurity measures also protect against the disruption or misdirection of services.

SUMMARY

Embodiments of the present invention are directed to computer-implemented methods for preventing fraud on smart devices. A non-limiting computer-implemented method includes, in response to receiving a communication, determining a correlation of the communication to a security threat, and obtaining device data of a device. The method includes determining that a combination of the correlation and the device data meets a predefined threshold for the security threat. Also, the method includes causing an alert to be audibly output on the device, the alert being a warning of the security threat presented by the communication.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments are configured and arranged to dynamically prevent fraud on smart devices, particularly mobile devices such as smart devices. According to one or more embodiments, a software application is installed on a mobile device to prevent fraud. The software application is configured to scan a conversation and determine if there are footprints of a potential scam attack. In one or more embodiments, when a potential scam is detected, the software application executes a voice alert to the user, thereby audibly warning the user of the mobile device that the scam attack is ongoing. Also, the software application can visually warn the user with a displayed warning message that a scam attack is ongoing and/or a displayed warning icon indicative of a scam attack or warning. Additionally, the software application can lock the display screen of the mobile device such that the user has to unlock the display screen by selecting an object (e.g., button) acknowledging that a scam attack is ongoing from the conversation.

Many people are aware of the risk of scams on mobile devices, such as scams from unsolicited phone calls, unsolicited text messages, etc., all of which are top cybersecurity concerns. For example, there are estimates that nearly 70 million Americans have lost money to phone scams in 2022, and nearly $40 billion was lost from various types of cybersecurity scams. Typically, phone scams include fraud that begins with calls and text messages. For example, someone calls pretending to be from a government agency or a company inquiring about a person's vehicle, home, account, etc.

Technical solutions and benefits include a novel method and system for dynamically preventing scams/fraud on mobile devices and performing security actions that interrupt/stop a conversation between the mobile device of the user and the device of the malicious attacker, according to one or more embodiments. As technical solutions and benefits, a cybersecurity service is provided in which the system automatically gathers segmented parts of the conversation for analysis. The system creates a correlation score based on a correlation of the gathered segmented parts of the conversation compared to a set of known cybersecurity scams. The system gathers pieces of data from the user device of the targeted user or victim to prevent false positives. The system can generate a secondary risk score, which can be called a scam score, based on a scam score algorithm. Using the scam score algorithm, the risk score is based on the correlation score for the automatically gathered segmented parts of the conversation weighed with values for the pieces of data from the user device. The system can create an audio file based on the scam score. When the scam score is a above a given threshold, the system reproduces the audio file as a warning to the targeted user or victim along with other alerts, thereby preventing the targeted user from conveying sensitive information.

One or more embodiments described herein can utilize machine learning techniques to perform tasks, such as classifying a feature of interest. More specifically, one or more embodiments described herein can incorporate and utilize rule-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Figure 1:
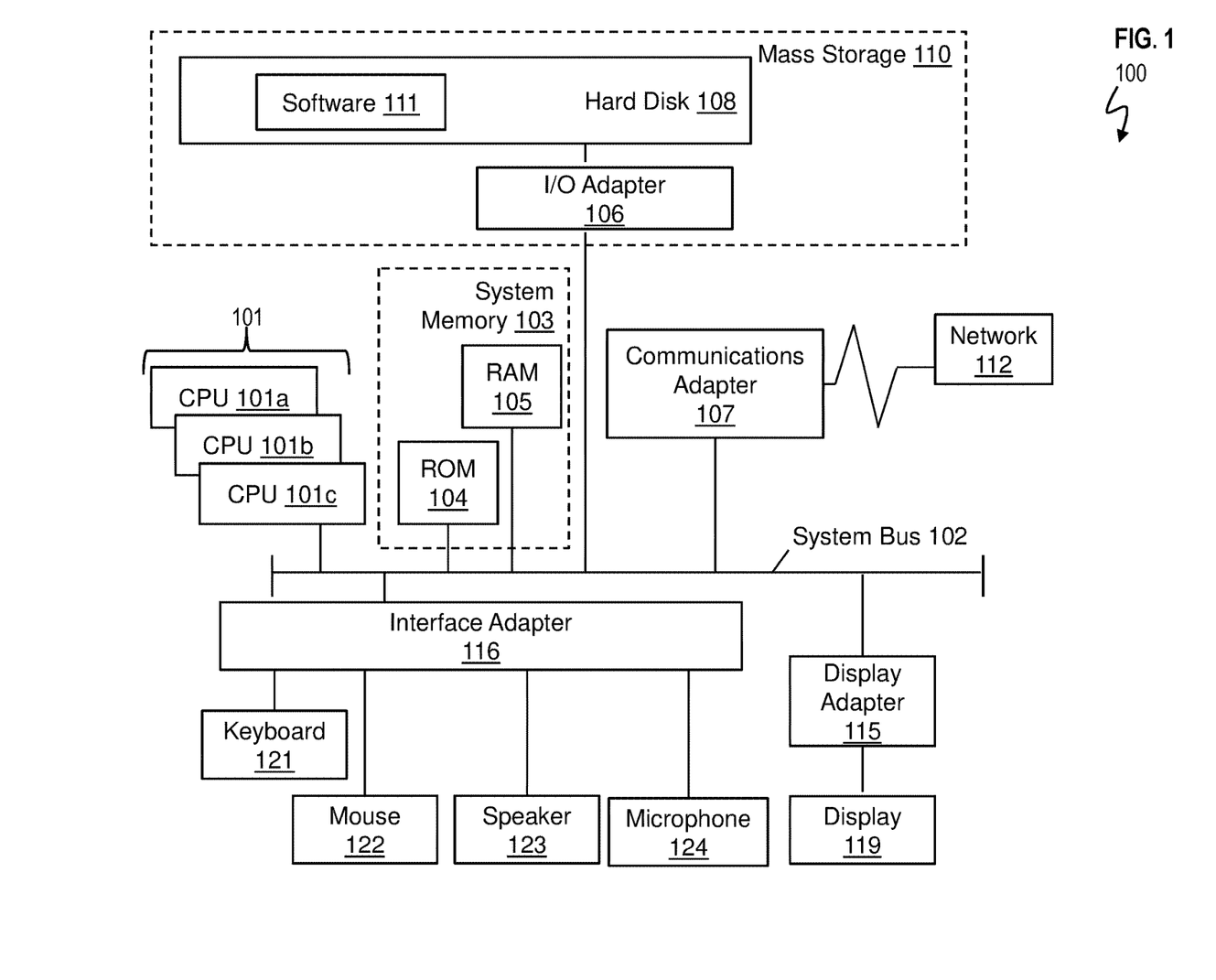
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
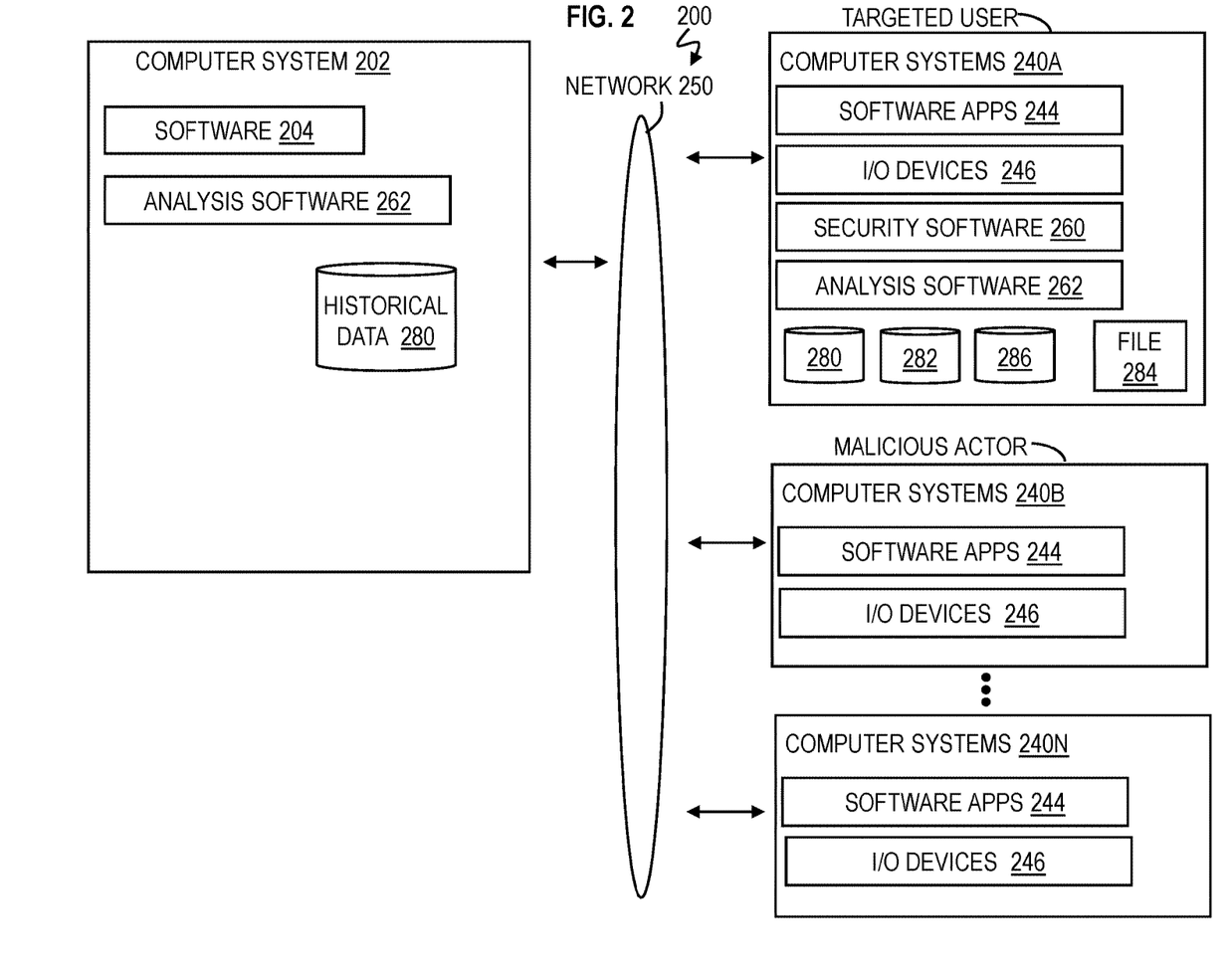
FIG. 2 depicts a block diagram of an example system configured to prevent fraud on smart devices according to one or more embodiments of the present invention.

FIG. 2 depicts a block diagram of an example system 200 configured to prevent fraud on mobile devices (e.g., smart devices) and perform security actions that interrupt/stop a conversation between the mobile device of the user and the device of the malicious attacker according to one or more embodiments. The system 200 includes a computer system 202 configured to communicate over a network 250 with many different computer systems, such as a computer system 240A, a computer system 240B, a computer system 240N. The computer systems 240A, 240B, through 240N can generally be referred to as computer systems 240 and are utilized for communication between one another, such as for phone calls, video calls, messaging including short message service (SMS) and multimedia messaging service (MMS), etc. The computer systems 240 can be representative of mobile devices including smart devices, etc. A smart device is an electronic device, generally connected to other devices or networks via different wireless protocols that can operate to some extent interactively. Several notable types of smart devices are smartphones, smart speakers, tablets, smartwatches, smart bands, smart glasses, and many others. The network 250 can be a wired and/or wireless communication network, and the communication network includes a telecommunications network, the public switched telephone network (PTSN), voice over IP (VOIP) network, etc. The communication network includes cellular networks, satellite networks, etc.

For explanation purposes and not limitation, some example scenarios may identify that a user of computer system 240A is the targeted user or potential victim of a cybersecurity attack such as a fraud, a scam, etc. The user of the computer system 240B is the malicious actor, potential attacker, scammer, etc., committing the fraud or scam against the targeted user. An example scenario may be that the malicious actor of computer system 240B places an unsolicited phone call to the targeted user of the computer system 240A in order to extract sensitive information from the targeted user, which is utilized to commit fraud against the targeted user. As a result, the sensitive information could be utilized by the malicious attacker to gain access improperly or illegally to servers on which confidential material can be accessed, financial accounts can be accessed, unauthorized transactions can made, etc.

The computer systems 240 can include various software and hardware components including software applications (apps) 244 for communicating with one another over the network 250 as understood by one of ordinary skill in the art.

The computer systems 240 can include one or more input/output (I/O) devices 246 including cameras, a microphone, a display, and other peripherals. The computer system 202, computer systems 240, software applications 244, software 204, security software 260, analysis software 262, etc., can include functionality and features of the computer system 100 in FIG. 1 including various hardware components and various software applications such as software 111 which can be executed as instructions on one or more processors 101 in order to perform actions according to one or more embodiments of the invention. The security software 260, the analysis software 262, the software 204 can include, be integrated with, and/or call other pieces of software, algorithms, application programming interfaces (APIs), etc., to operate as discussed herein. The security software 260 may be representative of numerous pieces of software designed to work together in order to provide cybersecurity services and protection for one or more computer systems.

The computer system 202 may be representative of numerous computer systems and/or distributed computer systems configured to provide security services to users of the computer systems 240. The computer system 202 can be part of a cloud computing environment such as a cloud computing environment 50 depicted in FIG. 6, as discussed further herein.

Figure 3A:
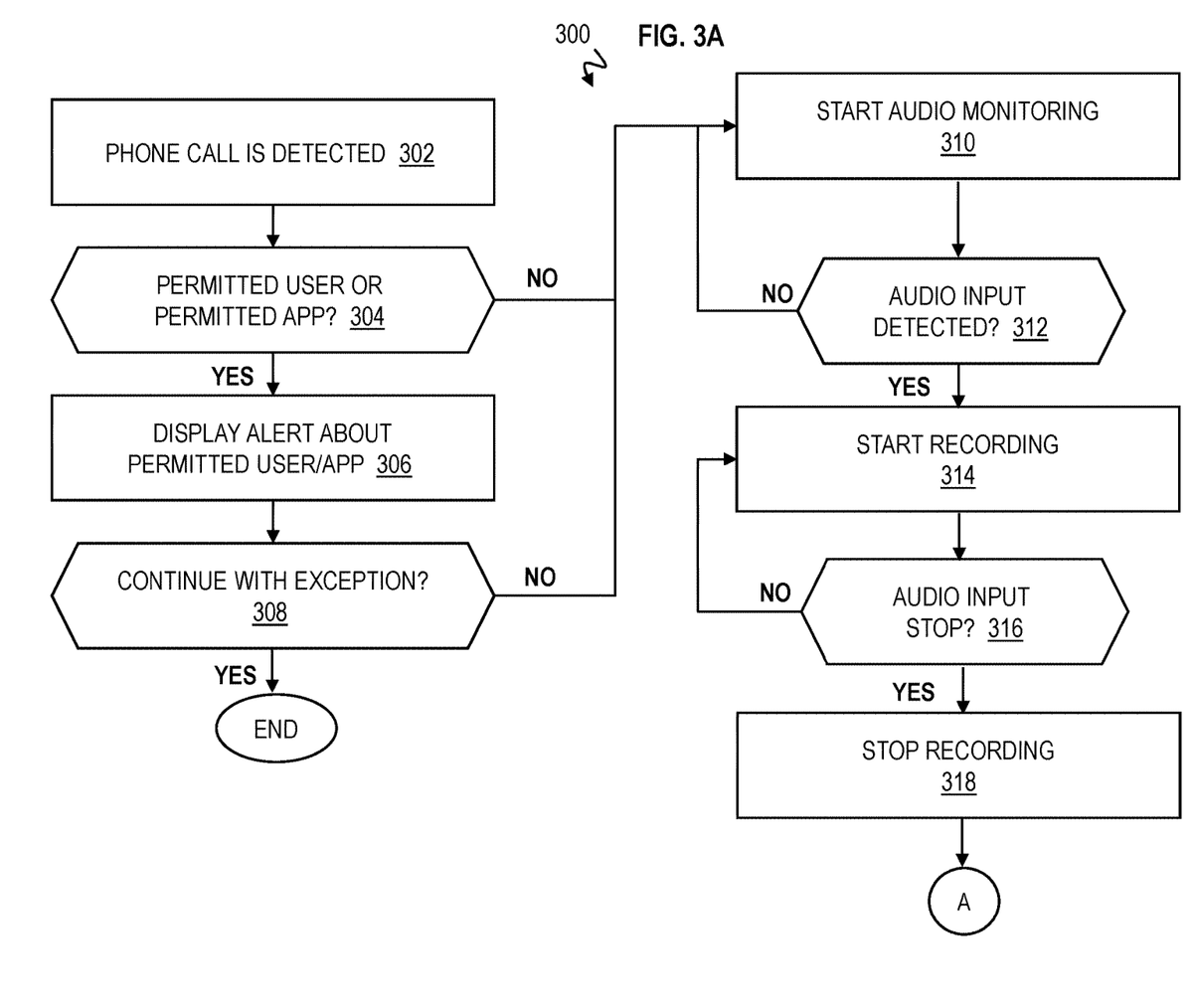
FIGS. 3A and 3B are a flowchart of a computer-implemented method for dynamically preventing scams/fraud on smart devices and performing security actions that interrupt/stop a conversation between a targeted user and a malicious attacker according to one or more embodiments of the present invention.
Figure 3B:
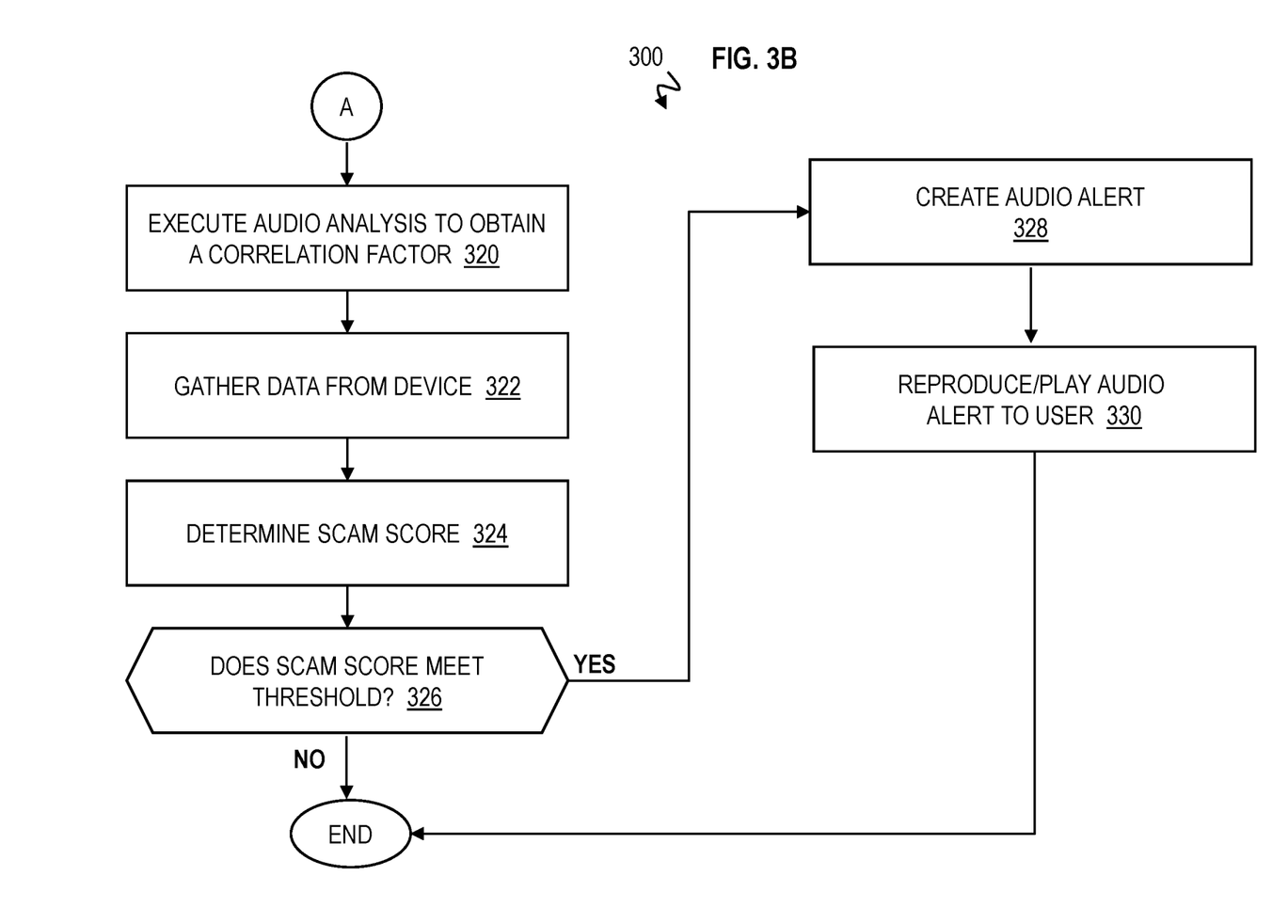

FIGS. 3A and 3B are a flowchart of a computer-implemented method 300 for dynamically preventing scams/fraud on mobile devices (e.g., smart devices) and performing security actions that interrupt/stop a conversation between the mobile device of the user and the device of the malicious attacker according to one or more embodiments. The computer-implemented method 300 can be executed by the computer system 240A in this example scenario. In one or more embodiments, the computer system 240A can communicate with the computer system 202 in order to cause the computer system 202 to assist with execution of one or more tasks, for example, in a client server relationship. Reference can be made to any figures discussed herein.

At block 302 of the computer-implemented method 300, the security software 260 of computer system 240A is configured to detect that a communication (e.g., phone call) is being received (e.g., ringing) by the computer system 240A, is being placed by the computer system 240A, has started (i.e., is ongoing), etc. The security software 260 can monitor the various types of software applications 244 loaded on and/or operating on the computer system 240A to detect if a call is being placed and/or received and to detect if a call is ongoing. The security software 260 can identify the software applications 244 on the computer system 240A capable of providing calls. The security software 260 may have an API, plugin, addon, etc., that interfaces with the respective software applications 244. In one or more embodiments, some examples of the software applications 244 may include the phone application that is the default phone application on a smart phone, along with various known communication applications downloaded from an app store such as the WHATSAPP® application, FACEBOOK® application, FACEBOOK MESSENGER® application, SKYPE® application, MICROSOFT TEAMS® application, phone by GOOGLE® application, ZOOM® application, CISCO WEBEX® application, etc. Once a call is received or placed using any applications of the software applications 244, the security software 260 is configured to detect the call and can immediately start recording the caller who in this case is the malicious attacker utilizing the computer system 240B. In one or more embodiments, the security software 260 can be triggered when the microphone (e.g., microphone 124) is operational and/or when the speaker output (e.g., speaker 123) is operational.

Further, a call is not limited to an audio connection between the called party and the calling party. Rather, the call can be an audio call, a video call, a conference call between multiple people with media and text, etc., in which one person can communicate with another person in real time or nearly in real time. The call includes two-way communications between various connected users, where each user can speak to others and concurrently hear other users speak.

Referring to FIG. 3A, optionally at block 304, the security software 260 is configured to check whether the software application 244 being utilized by the computer system 240A for providing the call is a permitted application or if the caller is a permitted contact/user. For example, the security software 260 stores permitted software applications 244 and permitted contacts/users in the permitted applications and contacts/users repository 282 such that these permitted software applications and contacts/users are not subject to the security services. In other words, the permitted software application and contacts/users are excepted from the security services. The permitted software applications 244 and permitted contacts/users are stored in advance and/or can be added in real time by the user. An example permitted software application 244 that does not need to be subject to security actions may be conferencing software applications where the user logs in for a conference, meeting, etc., with coworkers, clients, a boss, etc. Examples of permitted contacts/users may include a contact (number) for a parent, a contact for a spouse, a contact for a banking institution, etc.

Optionally at block 306, the security software 260 is configured to display message on the display (e.g., display 119) of the user in which the message indicates that the permitted software application and/or permitted contact/user is not subject to the security actions for fraud detection and monitoring. At block 308, the security software 260 is configured to ask the user does he/she wish to continue with the exception of allowing the displayed software application and/or contact/user not to be subject to the security actions for fraud detection and monitoring. If (Yes) the user selects a displayed button/option for the exception to continue, the flow ends.

If (No at block 308) the user selects a displayed button/option for the exception to end, or if (No at block 304) the call being detected is not from a permitted software application or a permitted contact/user listed in the repository 282, the flow proceeds to block 310. At block 310, the security software 260 is configured to start audio monitoring of the detected phone call to determine if there is a cyber-security attack.

At block 312, the security software 260 is configured to check if audio input is received by the software application 244 in operation, by the I/O devices 246 (e.g., speakers 123, microphone 124, etc.), etc. If (No) audio input is not received, the audio monitoring continues.

At block 314, the security software 260 is configured to start recording the audio input that is received from the malicious actor of computer system 240B. The security software 260 is configured to record when the caller is talking, for example, when the malicious actor of the computer system 240B is speaking. The security software 260 can distinguish audio input through the microphone 124 versus audio output through the speaker 123. The security software 260 can determine audio being processed for the speaker versus audio being processed from the microphone of the computer system 240. Although the security software 260 can cause audio to be recorded from both the targeted user of computer system 240A and from the malicious actor of computer system 240B, the security software 260 can choose to process the audio received from the malicious actor as discussed further herein. Only processing the segments of audio from the malicious actor allow for faster processing, less memory, and a faster determination of a security threat.

At block 316, the security software 260 is configured to continuously check whether the audio input has stopped from the malicious actor. If (No) the audio input has not stopped, the security software 260 continues recording.

At block 318, the security software 260 is configured to stop audio recording when the targeted user of the computer system 240A is talking. In one or more embodiments, the security software 260 stops the audio recording and saves the recording as an audio file, such as audio file 284. There could be many different audio files 284 of the conversation between the targeted user of the computer system 240A and the malicious actor of the computer system 240B. Although the security software 260 could record longer audio files 284, the reason the security software 260 is configured to cut the recording into smaller audio samples is because the smaller audio samples enhance the accuracy of the system by analyzing smaller pieces of the conversation. In one or more embodiments, in order to primarily record audio of the malicious actor, the security software 260 can stop the recording each time the malicious actor stops talking and recontinue the recording each time the malicious actor starts talking.

Referring to FIG. 3B, at block 320, the security software 260 is configured to execute audio analysis to determine a correlation factor between the audio file 284 and a scam or fraud. It is noted that the security software 260 can be integrated with, call, and/or employ known speech-to-text software to convert the audio of the audio file 284 to text for analysis. By the analysis, the security software 260 can output a correlation factor based on the similarity of the conversation to the information in the database of known attacks. When analyzing the conversation, the audio files 284 (which may include the equivalent representation in text) can be processed to correlate them against a historical database of known scams and fraud in a repository 280 to determine the probability that the call is a security attack. The security software 260 is configured to parse the text of the audio file for the comparison. The historical database of known scams and fraud in the repository 280 is a live database that gathers information from trusted sources to create a library of scam attacks. This subsystem connects to several sources including threat intelligence engines or government agencies to keep the library of scam attacks up-to-date.

In one or more embodiments, the security software 260 may be integrated with, call, and/or employ analysis software 262 to correlate the audio files 284 to the historical database of known scams and fraud in the repository 280 and then determine a correlation factor (CF) as a probability score that the call is an attack. The analysis software 262 can include rules-based logic and/or a machine learning model based on machine learning algorithms. The machine learning model can be trained on training data 286 of numerous conversations of scams and fraud that have been labeled for supervised training. A feature vector can be generated for each historical conversation of scams and fraud, and each of the feature vectors can be labeled scam/fraud in the training data 286 such that the machine learning algorithm of the machine learning model is trained. The feature vector is an ordered list of numerical properties of observed phenomena, and the feature vector represents input features to a machine learning model that makes a prediction. Also, in the training data 286, there are some feature vectors of conversations that are not scams and fraud, and such feature vectors can be labeled as a normal conversation (i.e., not a scam/fraud). Additionally, when classifying a conversation as a scam or fraud, the machine learning model can output a probability of the likelihood of being a scam and fraud as a correlation factor. In one or more embodiments, the security software 260 can utilize any known artificial intelligence technique, which may include a pre-trained model that is further trained with the training data 286, for comparing the audio files 284 to known scams and fraud. In one or more embodiments, the analysis software 262 may include, call, and/or employ any known natural language processing (NLP) model for processing the audio file and determining the correlation factor. The NLP model may be pre-trained and can be further trained on historical conversations of scams and fraud to determine the correlation factor of the audio file 284 containing a scam or fraud.

At blocks 322 and 324, the security software 260 is configured to collect device data from the computer system 240A of the targeted user and generate a scam score. The scam score is the likelihood that the call is a scam or fraud, which means the higher the scam score, the more likely the caller is attempting to scam or defraud the targeted user. In one or more embodiments, the scam score could be based solely on the correlation factor, which is the probability that the audio file 284 correlates to a scam or fraud in the historical data in the repository 280 as discussed in block 302. In one or more embodiments, the security software 260 utilizes the additional device data of the computer system 240A to improve the scam score as discussed below.

The additional device data may include a list of contacts in and/or associated with computer system 240A of the targeted user. The security software 260 is configured to evaluate if the call is from a contact. For example, if the call is from a contact of the targeted user, the scam score is decreased by a predetermined amount; otherwise, the scam score is increased by a predetermined amount.

The additional device data may include mutual connections associated with computer system 240A of the targeted user and the caller. For example, the security software 260 is configured to evaluate if the caller of computer system 240B has any mutual connections with the targeted user of computer system 240A. This can be achieved by checking for friends and mutual connections on social media websites, social media applications, such as FACEBOOK®, WHATSAPP®, etc. When the security software 260 determines that there are mutual friends/connections between targeted user and the caller (e.g., malicious actor), the security software 260 can reduce the scam score by a predetermined amount; otherwise, the scam score is increased by a predetermined amount.

The additional device data may include recent calls on the computer system 240A of the targeted user. The security software 260 is configured to evaluate the number of previous calls (communications) with that caller (e.g., potential malicious attacker) on the computer system 240B contact and adjust the scan score accordingly. For example, the targeted user may regularly call a restaurant and/or receive calls from a restaurant, where personal sensitive information is discussed. When a number of the recent calls to and/or from a particular number (or entity) meets a predetermined threshold, the security software 260 can reduce the scam score by a predetermined amount; otherwise, the scam score is increased by a predetermined amount. It should be that other types of device data of and/or associated with the computer system 240A of the targeted user can be utilized to increase or decrease the scam score.

Once the additional device data is collected for the computer system 240A of the targeted user, the security software 260 is configured to use the following scam score algorithm to generate the scam score in one or more embodiments.

$$\text{Scam Score} = (CF * 0.9) + (LCp * 0.5) + (LCn * -0.5) + (MCp * 0.2) + (MCn * -0.4) + ((RCs/RCc) * 0.1),$$

where:

CF is the Correlation Factor (variable);
LCp indicates if the caller is on the receiver contacts, for example, LCp=1 if true, LCp=0 if false;
LCn indicates if the caller is not on the receiver contacts, for example, LCn=1 if true, LCn=0 if false.
MCp indicates if caller has contacts in common, for example, MCp=1 if true, MCp=0 if false;
MCn indicates if caller does not have contacts in common, for example, MCn=1 if true, MCn=0 if false.
RCs indicate the total number of calls received on that application; and
RCc indicates the total number of calls received from current caller.

In one or more embodiments, it should be appreciated that one or more of the inputs to the scam score can be excluded (except the correlation factor) and/or can be nullified to zero. In one or more embodiments, one or more additional inputs could be added in the scam score algorithm with an appropriate weight.

At block 326, the security software 260 is configured to check if the determined scam score is above a predetermined threshold. If (No) the scam score is not above the predetermined threshold, the flow ends.

At blocks 328 and 330, if (Yes) the scam score is above the predetermined threshold, the security software 260 is configured to create an audio alert warning about the potential scam and fraud and then reproduce/play the audio alert on the speaker 123 of the computer system 240A for the targeted user. Although an audio alert is illustrated for explanation purposes, the alert is not limited to an audio alert as discussed further herein.

Figure 4:
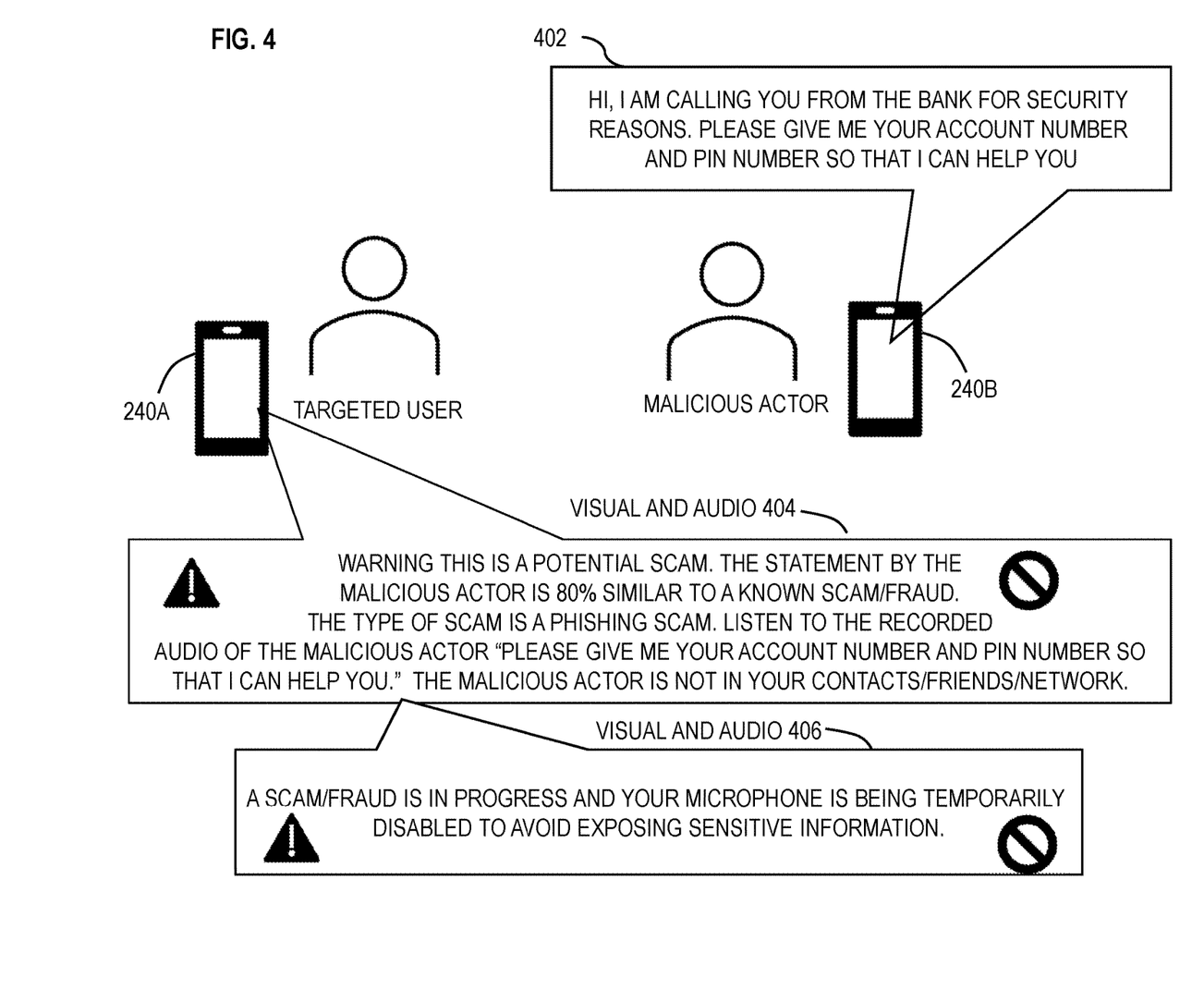
FIG. 4 depicts an example conversation between a targeted user and a malicious actor in which security services are being performed according to one or more embodiments of the present invention.

In one or more embodiments, when the scam score meets or is above the predetermined threshold, the security software 260 can create the audio alert using a combination of the data available, including the scam score, the type of scam, and the relevant device data that is gathered for the computer system 240A of the targeted user. As audibly output on the speaker 123 and visibly displayed on the display 119 of the computer system 240A to the targeted user, the alert can indicate any one or more of the following: (1) the statement(s) by the malicious actor is 80% similar to a scam/fraud in the historical database of known scams/fraud, (2) the type of scam is a phishing scam, (3) the recorded audio (as part of the scam/fraud) of the malicious actor speaking will now play "please give me your account number and pin number so that I can help you," and (3) the malicious actor is not in your contacts/friends/network (as the relevant device data). FIG. 4 depicts an example conversation between a targeted user and a malicious actor in which security services are being performed by the security software 260 according to one or more embodiments. As seen in FIG. 4, the security software 260 is preventing fraud on computer system 240A (e.g., smart device) and performing security actions that interrupt/stop the conversation between the computer system 240A of the targeted user and the computer system 240B of the malicious attacker. The malicious actor may audibly output block 402 to defraud the targeted user. The security software 260 is configured to prevent the fraud by providing the visual and audio output 404 to the targeted user along with the visual and audio output 406.

As further examples of the relevant data output to the computer system 240A of the targeted user as the alert, the security software 260 can audibly and visually output whether the malicious actor is in the contacts of the targeted user (e.g., the malicious actor is not in your contacts or vice versa), whether the malicious actor has called the targeted user (e.g., the malicious actor has never called you before or vice versa), whether the malicious actor is part of the friends/network on social media of the targeted user (e.g., the malicious actor is not part of your friends/network on social media or vice versa), etc.

The security software 260 is configured to output the alert to the targeted user in real time or near real time in order to interrupt the targeted user from exposing his/her sensitive information to the malicious actor. Again, although an audio alert has been utilized in some examples, the alert can also include a visual alert displayed on the display of the targeted user, a haptic alert such as a forceful and continuous vibration of the device (e.g., phone), etc. For the audio alert, the security software 260 can provide a warning and reproduce the audio of the scam that can only be listened to by the targeted user (e.g., potential victim). The alert can include a popup alert of the display 119, where the security software 260 causes the operating system of the computer system 240A to execute the alert including beeping, vibrating, flashing lights, playing music, etc. It should be appreciated that the security software 260 can cause any combination of audio alerts, visual alerts, and haptic alerts to be output on the computer system 240A of the targeted user so as to warn and prevent the targeted user from providing sensitive information to the malicious actor. In one or more embodiments, the security software 260 may also disable the microphone 124 of the targeted user to prevent him/her from providing the sensitive information to the malicious actor. The security software 260 may recognize that the targeted user of the computer system 240A is still in the conversation with the malicious actor of the computer system 240BA, and accordingly, the security software 260 may temporarily disable the microphone 124 of the targeted user in addition to outputting the alert (e.g., audio alert, visual alert, and/or haptic alert). The security software 260 can alert (e.g., with an audio alert, visual alert, and/or haptic alert) the targeted user that a scam/fraud is in progress and your microphone is being temporarily disabled to avoid exposing sensitive information to the malicious actor, as depicted in FIG. 4. In FIG. 4, examples of the call can include a voice call, a video call, and/or an interactive call (e.g., conference call) with audio, video, text (chat), media presentations, etc.

The identification of many different types of scams/fraud that can be audibly and visually output to the computer system 240A of the targeted user, which can include phishing and social engineering scams; catfishing, romance, and dating scams; fraudulent marketing scams; fake influencer scams; crypto investment scams; prize pool and giveaway scams; identity theft and account takeover scams; etc.

The security software 260 can include a feedback module in which the security software 260 provides the targeted user with a displayable option to validate other users to avoid false positives. For selection by and display to the targeted user, the security software 260 offers a selectable option for adding a user to the permitted list of users and/or adding a software application 244 to the permitted list of software applications in the repository 282. For example, the security software 260 can display a button that indicates add to the permitted list, which applies to both contacts/users and software applications. The permitted list of users/contacts is a list of users for which the security software 260 avoids execution of the security services. For example, after the security software 260 checks and confirms that a given user/contact is on the permitted list, the security software 260 discontinues any security services related to the given user/contact. Similarly, the permitted list of software applications is a list of software applications for which the security software 260 avoids execution of the security services. For example, after the security software 260 checks and confirms that a given software application 244 is on the permitted list, the security software 260 discontinues any security services related to the given software application.

Further, the security software 260 can provide a displayed option for topic exception. The topic exception enables the exclusion of a given set of topics from being the subject of security scam services by the security software 260. This is a way to add topics to a permitted list of topics (e.g., in the repository 282) for the targeted user. For example, the targeted user of computer system 240A may be a person that sells phones and may regularly discuss password reset, account setup, etc. As such, the security software 260 is configured with the ability to exclude that topic to prevent false positives, thereby improving the user experience.

Figure 5:
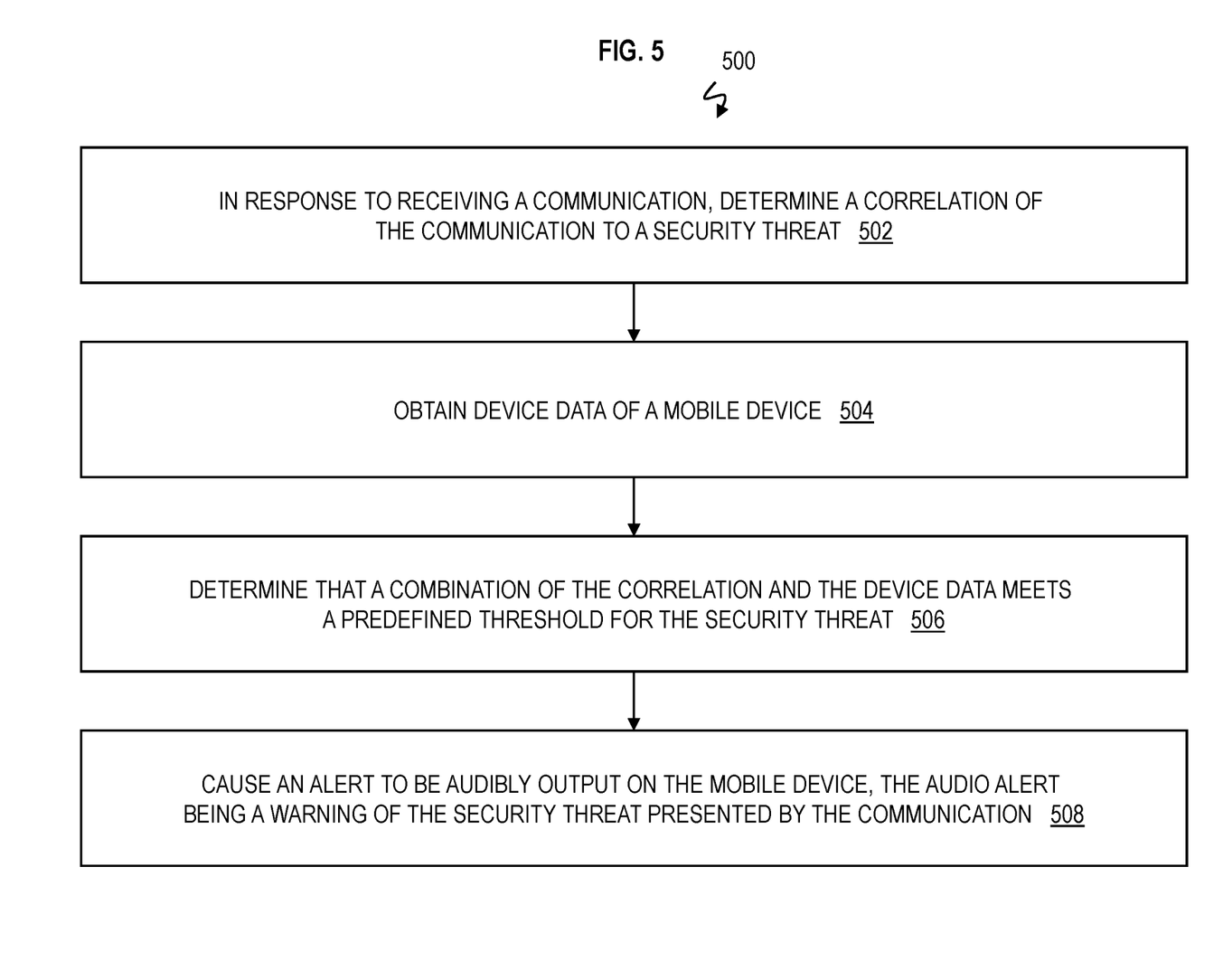
FIG. 5 is a flowchart of a computer-implemented method for dynamically preventing scams/fraud on smart devices and performing security actions that interrupt/stop a conversation between a targeted user and a malicious attacker according to one or more embodiments of the present invention.

FIG. 5 is a flowchart of a computer-implemented method 500 for dynamically for dynamically preventing scams/fraud on mobile devices (e.g., smart devices) and performing security actions that interrupt/stop a conversation between the mobile device of the user and the device of the malicious attacker according to one or more embodiments. The computer-implemented method 500 can be executed by the computer system 240A in an example scenario. In one or more embodiments, the computer system 240A can communicate with the computer system 202 in order to cause the computer system 202 to assist with execution of one or more tasks, for example, in a client server relationship. Reference can be made to any figures discussed herein.

At block 502, the security software 260 of the computer system 240A is configured to, in response to receiving a communication, determine a correlation (e.g., correlation factor) of the communication to a security threat. The correlation (e.g., correlation factor) can be, for example, the likelihood (e.g., 80%) that a portion of the communication includes a scam/fraud.

At block 504, the security software 260 is configured to obtain device data of a mobile device (e.g., the computer system 240A). The device data of the computer system 240A can include a list of contacts of the computer system 240A, include mutual connections associated with computer system 240A and the computer system 240B of the malicious actor, and/or include recent calls on the computer system 240A.

At block 506, the security software 260 is configured to determine that a combination (e.g., scam score) of the correlation and the device data meets a predefined threshold for the security threat. The scam score is based on the correlation factor, and the scam score can be increased or decreased according to values for the device data. For example, the scam score can be increased or decreased based on any one or more of the LCp, LCn, MCp, MCn, RCs, and RCc.

At block 506, the security software 260 is configured to cause an alert to be audibly output on the mobile device (e.g., computer system 240A of the targeted user), the audio alert being a warning of the security threat presented by the communication.

In one or more embodiments, the alert visually and audibly includes a portion of the communication. The alert includes recorded audio (e.g., audio file 284) from a malicious actor causing the security threat, the recorded audio includes a phrase intended to defraud a listener. The alert includes a visual indicator displayed on the mobile device. The visual indicators can include text displayed as a warning on the display 119, one or more caution icons as depicted in FIG. 4, flashing the screen, stopping the visual display on the display screen, etc.

In one or more embodiments, the alert includes an audible version of a portion of the device data that is output to the user via the speaker 123 along with a visual output displayed on the display 119. The audio version of the device data includes audibly speaking, for example, using text-to-speech software, on the speaker 123 whether (LCp) the caller (e.g., malicious actor) is on the receiver contacts of the targeted user, whether (LCn) the caller is not on the receiver contacts targeted user, whether (MCp) the caller has contacts in common with the targeted user, whether (MCn) the caller does not have contacts in common with the targeted user, indicate (RCs) the total number of calls received on that application of the targeted user, and indicate (RCc) the total number of calls received from current caller (e.g., malicious actor).

In one or more embodiments, the alert is output on the mobile device (e.g., computer system 240A) as an interruption to a function of the mobile device. The alert can temporarily disable the microphone from functioning, temporarily disable the speaker from functioning, temporarily place the call on hold (along with providing a default audio message that the call is on hold to both the targeted user and the malicious actor), etc. The communication includes an audio recording from a conversation between a targeted user of the mobile device (e.g., computer system 240A) and a malicious actor using another device (e.g., computer system 240B).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
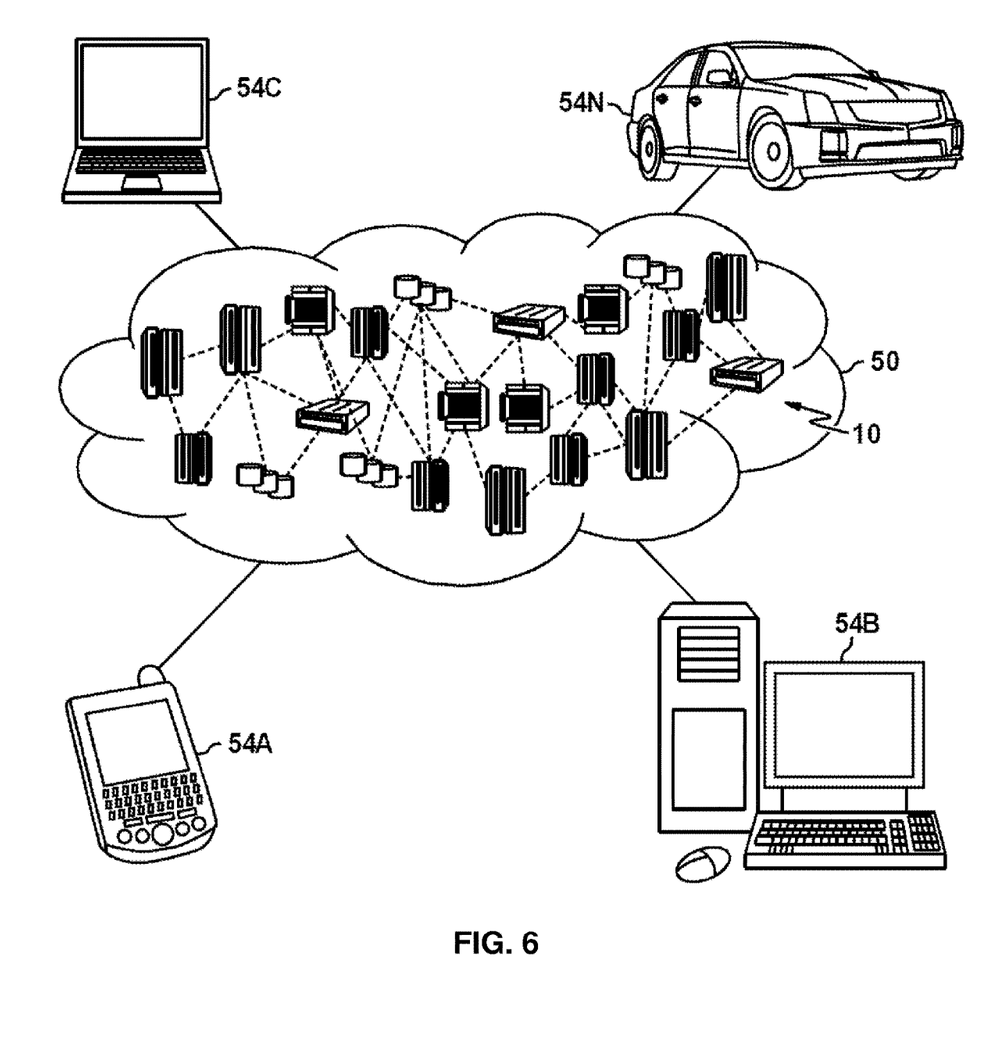
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
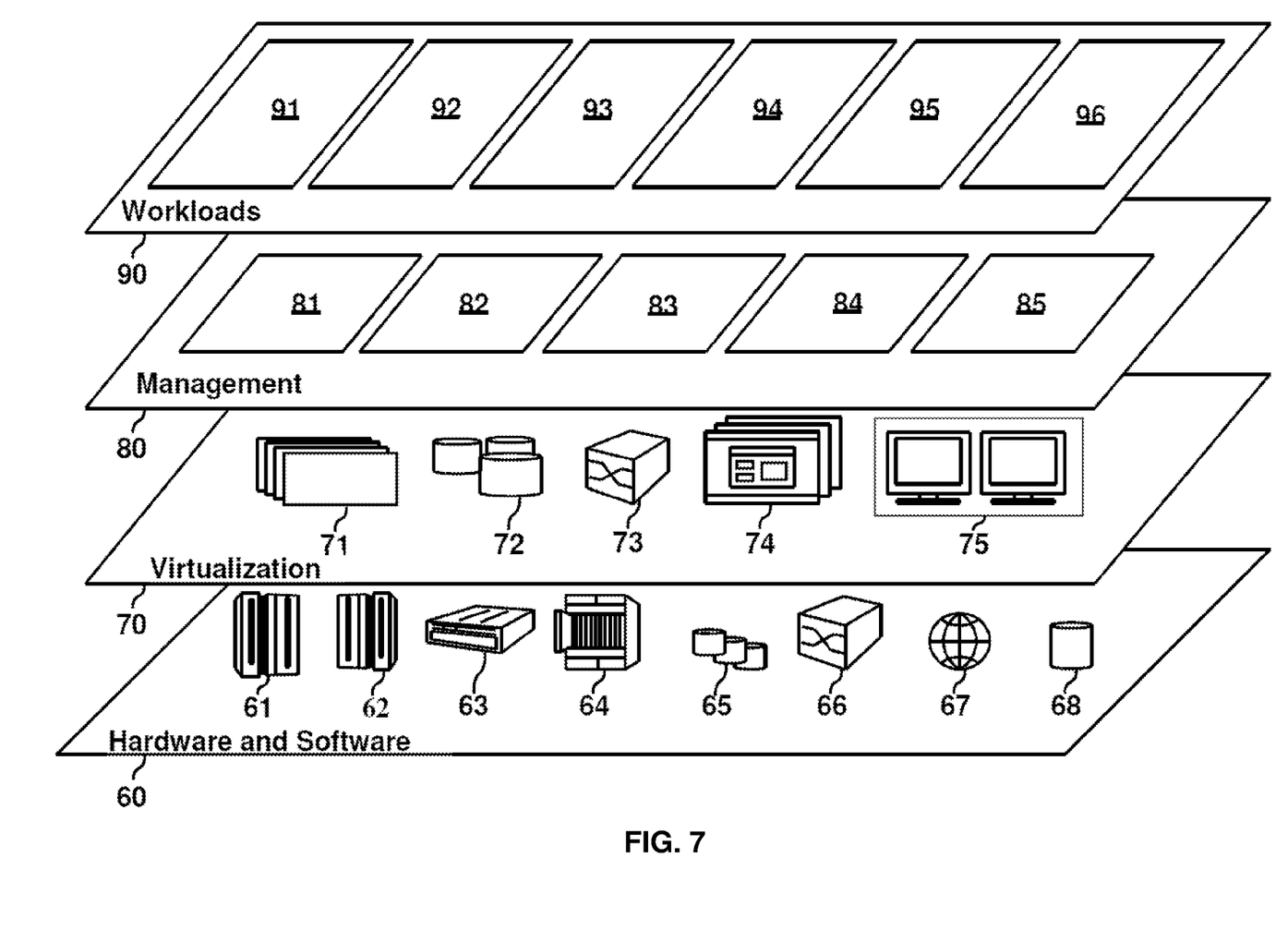
FIG. 7 depicts abstraction model layers according to one or more embodiments of the present invention.

Referring now to FIG. 7, a set of functional abstraction layers provided by cloud computing environment 50 (depicted in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   in response to receiving a communication, determining a correlation of the communication to a security threat;
   obtaining device data of a device associated with a targeted user;
   determining that a combination of the correlation and the device data meets a predefined threshold for the security threat; and
   causing an alert to be audibly output on the device during the communication that is ongoing, the alert being a warning of the security threat presented by the communication that is ongoing, wherein:
   the alert comprises replaying, during the communication that is ongoing, a portion of the communication in which the portion is intended to defraud the targeted user;
   additional data comprises recent calls on the device; and
   in response to a determination that a number of the recent calls, related to the targeted user from a potentially malicious caller who has mutually known users associated with the targeted user, reaches a predetermined amount, a scam score of the combination of the correlation and the device data of the targeted user is reduced, where information associated with the mutually known users is from social media applications.

2. The computer-implemented method of claim 1, wherein: communication a selectable button is displayed on the device indicating that an exception is being made for a caller during the communication that is ongoing, the exception allowing the caller to avoid being subject to fraud and detection monitoring; and in response to the selectable button being selected on the device, the fraud and detection monitoring is discontinued during the communication that is ongoing.

3. The computer-implemented method of claim 1, wherein, in real time during the communication that is ongoing, the alert comprises recorded audio from a malicious actor causing the security threat, the recorded audio comprising a phrase intended to defraud a listener such that the targeted user recognizes an intent of the malicious actor.

4. The computer-implemented method of claim 1, wherein the alert comprises a visual indicator displayed on the device during the communication that is ongoing.

5. The computer-implemented method of claim 1, wherein the alert is executed on the device as an interruption to a microphone function of the device to avoid an exposure of sensitive information.

6. The computer-implemented method of claim 1, wherein the communication includes an audio recording from a conversation between the targeted user of the device and a malicious actor using another device.

7. A system comprising:
   a memory having computer readable instructions; and
   one or more processors for executing the computer readable instructions, the computer readable instructions when executed cause the one or more processors to perform operations comprising:
   in response to receiving a communication, determining a correlation of the communication to a security threat;
   obtaining device data of a device associated with a targeted user;
   determining that a combination of the correlation and the device data meets a predefined threshold for the security threat; and
   causing an alert to be audibly output during the communication that is ongoing, the alert being a warning of the security threat presented by the communication that is ongoing, wherein:
   the alert comprises replaying, during the communication that is ongoing, a portion of the communication in which the portion is intended to defraud the targeted user;
   additional data comprises recent calls on the device; and in response to a determination that a number of the recent calls, related to the targeted user from a potentially malicious caller who has mutually known users associated with the targeted user, reaches a predetermined amount, a scam score of the combination of the correlation and the device data of the targeted user is reduced, where information associated with the mutually known users is from social media applications.

8. The system of claim 7, wherein: a selectable button is displayed on the device indicating that an exception is being made for a caller during the communication that is ongoing, the exception allowing the caller to avoid being subject to fraud and detection monitoring; and in response to the selectable button being selected on the device, the fraud and detection monitoring is discontinued during the communication that is ongoing.

9. The system of claim 7, wherein, in real time during the communication that is ongoing, the alert comprises recorded audio from a malicious actor causing the security threat, the recorded audio comprising a phrase intended to defraud a listener such that the targeted user recognizes an intent of the malicious actor.

10. The system of claim 7, wherein the alert comprises a visual indicator displayed on the device during the communication that is ongoing.

11. The system of claim 7, wherein the alert is executed on the device as an interruption to a microphone function of the device to avoid an exposure of sensitive information.

12. The system of claim 7, wherein the communication includes an audio recording from a conversation between the targeted user of the device and a malicious actor using another device.

13. A non-transitory computer readable storage medium having program instructions embodied therewith, the program instructions executable by one or more processors to cause the one or more processors to perform operations comprising:
in response to receiving a communication, determining a correlation of the communication to a security threat;
obtaining device data of a device associated with a targeted user;
determining that a combination of the correlation and the device data meets a predefined threshold for the security threat; and
causing an alert to be audibly output during the communication that is ongoing, the alert being a warning of the security threat presented by the communication that is ongoing, wherein:
the alert comprises replaying, during the communication that is ongoing, a portion of the communication in which the portion is intended to defraud the targeted user;
additional data comprises recent calls on the device; and
in response to a determination that a number of the recent calls, related to the targeted user from a potentially malicious caller who has mutually known users associated with the targeted user, reaches a predetermined amount, a scam score of the combination of the correlation and the device data of the targeted user is reduced, where information associated with the mutually known users is from social media applications.

14. The computer readable storage medium of claim 13, wherein: a selectable button is displayed on the device indicating that an exception is being made for a caller during the communication that is ongoing, the exception allowing the caller to avoid being subject to fraud and detection monitoring; and in response to the selectable button being selected on the device, the fraud and detection monitoring is discontinued during the communication that is ongoing.

15. The computer readable storage medium of claim 13, wherein, in real time during the communication that is ongoing, the alert comprises recorded audio from a malicious actor causing the security threat, the recorded audio comprising a phrase intended to defraud a listener such that the targeted user recognizes an intent of the malicious actor.

16. The computer readable storage medium of claim 13, wherein the alert comprises a visual indicator displayed on a device during the communication that is ongoing.

17. The computer readable storage medium of claim 13, wherein the alert is executed on the device as an interruption to a microphone function of the device to avoid an exposure of sensitive information.

* * * * *